(12) United States Patent
Clark

(10) Patent No.: US 7,017,223 B2
(45) Date of Patent: Mar. 28, 2006

(54) VEHICLE WASHING BRUSH ASSEMBLY

(76) Inventor: G. Jack Clark, 4769 Paw Paw Lake Rd., Coloma, MI (US) 49038

( * ) Notice: Subject to any disclaimer, the term of this patent is extended or adjusted under 35 U.S.C. 154(b) by 300 days.

(21) Appl. No.: 10/310,011

(22) Filed: Dec. 4, 2002

(65) Prior Publication Data
US 2003/0079308 A1    May 1, 2003

Related U.S. Application Data

(63) Continuation-in-part of application No. 09/873,758, filed on Jun. 4, 2001, now abandoned.

(51) Int. Cl.
   *B60S 3/06*  (2006.01)
(52) U.S. Cl. .................. 15/230; 15/97.3; 15/DIG. 2
(58) Field of Classification Search ........ 15/53.1–53.3, 15/97.3, DIG. 2, 230, 230.12, 230.14, 230.15, 15/230.16, 230.17, 230.18, 230.19
   See application file for complete search history.

(56) References Cited

U.S. PATENT DOCUMENTS

| | | |
|---|---|---|
| 1,298,096 A | 3/1919 | Roberts |
| 2,637,054 A | 5/1953 | Holmes |
| 3,345,666 A | 10/1967 | Hanna et al. |
| 3,747,151 A | 7/1973 | Takeuchi |
| 3,867,735 A | 2/1975 | Takeuchi |
| 3,939,521 A | 2/1976 | Clark |
| 4,039,014 A * | 8/1977 | Sellars ................... 15/53.3 |
| 4,142,267 A | 3/1979 | Clark |
| 4,441,226 A | 4/1984 | Hanna |
| 4,603,447 A * | 8/1986 | Beer ...................... 15/97.3 |
| 4,608,726 A | 9/1986 | Hanna |
| 4,670,929 A | 6/1987 | Hanna |
| 4,756,041 A | 7/1988 | Hanna |
| 5,623,741 A | 4/1997 | Clark |
| 6,733,861 B1 * | 5/2004 | Belanger ................. 428/114 |

OTHER PUBLICATIONS

U.S. Appl. No. 09/816,058, Applicant: G. Jack Clark, filed Mar. 23, 2001, including specification, claims, abstract and 6 sheets of drawings.

* cited by examiner

*Primary Examiner*—Terrence R. Till
(74) *Attorney, Agent, or Firm*—Flynn, Thiel, Boutell & Tanis, P.C.

(57) ABSTRACT

A vehicle washing brush assembly which includes a cylindrical holder configuration having plural cloth or foam pads secured thereto and configured to be centrifugally extended radially outwardly from the holder and into surface treating engagement with a vehicle surface. A first longitudinal length of the holder has a selected number of separate cloth or foam pads oriented around the perimeter of said holder so that the ratio of the number of cloth or foam pads per 360° of the holder to the outer diameter of the holder is in the range of 5 to 12. A second longitudinal length of said holder having a selected number of separate cloth or foam pads oriented around the perimeter of the holder so that the ratio of the number cloth or foam pads per 360° of the holder to the outer diameter of the holder is 6.0 or less.

2 Claims, 3 Drawing Sheets

THE HUGGER

FIG. 2

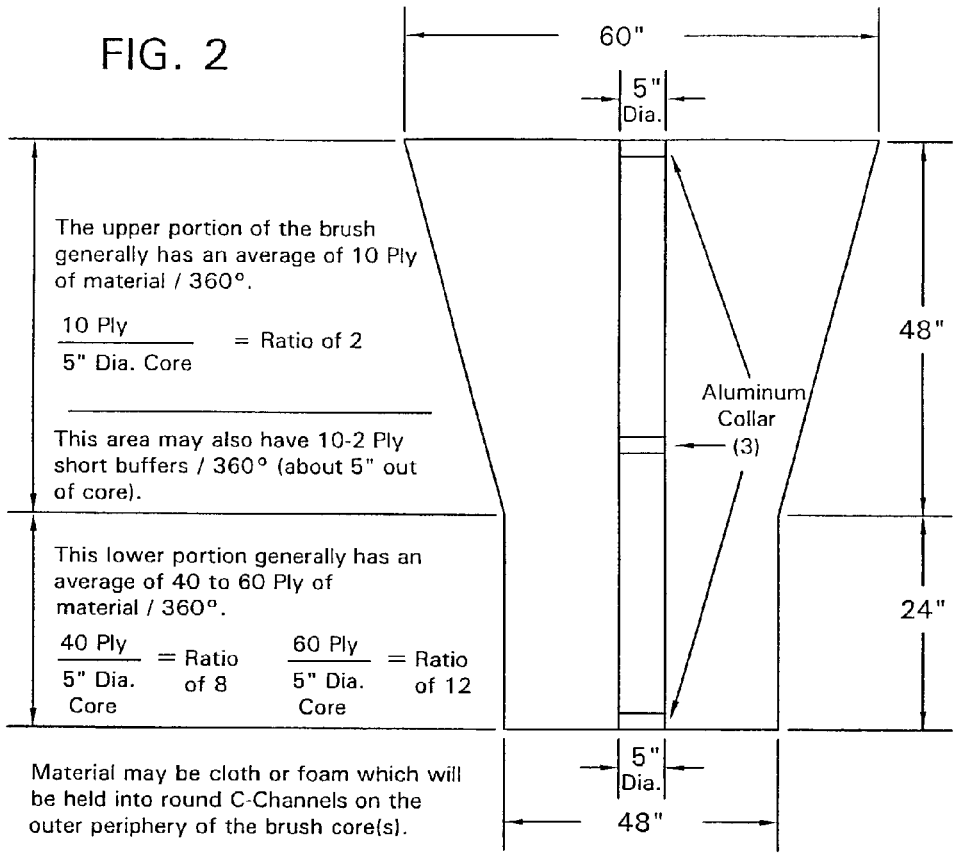

The upper portion of the brush generally has an average of 10 Ply of material / 360°.

$$\frac{10 \text{ Ply}}{5" \text{ Dia. Core}} = \text{Ratio of 2}$$

This area may also have 10-2 Ply short buffers / 360° (about 5" out of core).

This lower portion generally has an average of 40 to 60 Ply of material / 360°.

$$\frac{40 \text{ Ply}}{5" \text{ Dia. Core}} = \text{Ratio of 8} \qquad \frac{60 \text{ Ply}}{5" \text{ Dia. Core}} = \text{Ratio of 12}$$

Material may be cloth or foam which will be held into round C-Channels on the outer periphery of the brush core(s).

FIG. 3

Brush Halves (2)

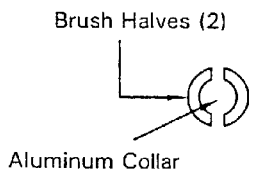

Aluminum Collar 2 aluminum brush halves are welded to the 3 aluminum collars. Collars are 2" thick and fit tight inside brush core halves. Brush Core halves are also welded together from the outside.

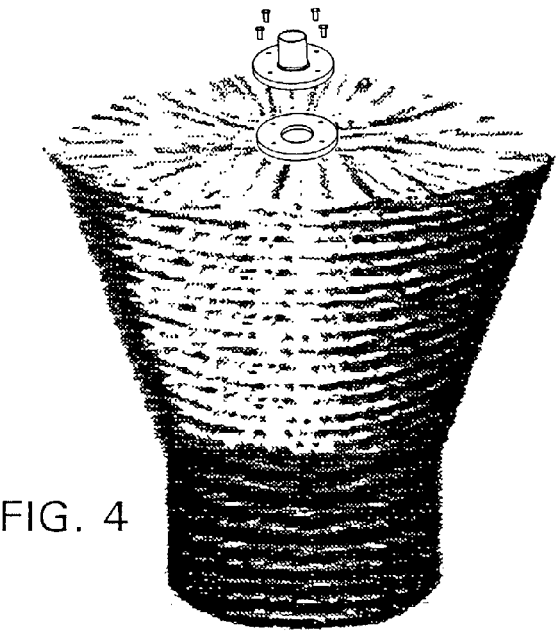

FIG. 4

VEHICLE WASHING BRUSH ASSEMBLY

CROSS-REFERENCE TO RELATED APPLICATION

This is a continuation-in-part of U.S. Ser. No. 09/873,758, filed Jun. 4, 2001 now abandoned.

BACKGROUND OF THE INVENTION

Brushes that have been used in the car wash industry in the last several years (see FIG. 1) have been made with cleaning material in pad-form of cloth and, in some cases, pad-form of foam. These have been quite successful. The most popular type of brush unit for cleaning the front, sides and rear of vehicles is approximately six feet (6') high. Actually there is usually an upper brush about four feet (4') tall with material quite sparse to avoid mirror and aerial problems that would be distorted, bent or broken if this upper brush is too dense. However, since this is the cleanest part of the vehicle, a sparse brush cleans this part of the vehicle quite well. Below this brush and usually on the same shaft is the lower brush which must have an adequate amount of material to clean the dirtiest part of the vehicle, namely the rocker panel area, and also have enough "body" to prevent the brush core from coming too close to the vehicle and causing damage to the vehicle and/or the brush. The bottom brush or bottom area of a single, taller brush is what determines how close the entire brush core(s) gets to the vehicle.

In a constant effort to attempt to better the quality of vehicle washing by upgrading the brushes, I have studied the structural requirements to determine what it would take to do that and whether it be practical. After listening to what car-wash owners saw as some shortcomings of standard brushes of the FIG. 1 type, I determined that for a brush to clean with maximum efficiency and eliminate the "cleaning misses", the brush core would need to be as small as practical in order to penetrate the hard-to-get-at areas, such as behind mirrors and into crevices and vehicle curves and also the backs of vehicles. Not only must the brush core be small but it must "hug" the vehicle throughout its cleaning cycle. By "hugging" the vehicle:
1) the brush should not move excessively from the vehicle's mirrors or other protrusions and the corners of the vehicle and
2) the brush should be in smooth contact with the vehicle in such a manner that the distance between the brush core and the outermost part of the vehicle always remains quite constant and is usually between five inches (5") and eleven inches (11") (approximately).

SUMMARY OF THE INVENTION

While experimenting with a brush having a minimum core diameter, I soon discovered that right along with core diameter, the ratio of the number of cloth plies to the core diameter is also very important primarily in the lower ⅓ of the brush. Normally brushes have, in this area, a maximum ratio of material ply/360° to core diameter of 4.0 (ply is the number of pads striking the vehicle as the brush turns one revolution). The next thought was to use as small a core as possible and increase a ratio of material ply/360° to core diameter to see if this theory would work. This was done to yield a ratio of 5 but also as high as 12 the preference being in the range of 8 to 12. To increase this ratio on a larger diameter core would make the brush very expensive and less apt to get into the curves and crevices and clean well. It would also make it harder to control the brush action as it would become prohibitively heavy and could cause vehicle damage after this heavier brush traveled around areas where mirrors or vehicle corners are located and then come crashing back against the vehicle to even cause the brush to bounce against the vehicle. This would contribute to more "cleaning misses" and so would diminish the cleaning action of the standard design of FIG. 1.

A vehicle washing brush assembly which includes a cylindrical holder configuration having plural cloth or foam pads secured thereto and configured to be centrifugally extended radially outwardly from the holder and into surface treating engagement with a vehicle surface. A first longitudinal length of the holder has a selected number of separate cloth or foams pads oriented around the perimeter of said holder so that the ratio of the number of cloth or foam pads per 360° of the holder to the outer diameter of the holder is in the range of 5 to 12, preferably in the range of 8 to 12. A second longitudinal length of said holder having a selected number of separate cloth or foam pads oriented around the perimeter of the holder so that the ratio of the number cloth or foam pads per 360° of the holder to the outer diameter of the holder is 6.0 or less.

BRIEF DESCRIPTION OF THE DRAWINGS

FIG. 2 is a schematic illustration of a rotary brush construction embodying my invention;

FIG. 3 is a detail of my inventive brush construction;

FIG. 4 is an isometric representation of my inventive rotary brush construction.

DETAILED DESCRIPTION

As shown in FIG. 2, a five inch (5") core or holder with 60 ply of cloth has the same ratio of ply to core diameter as a twelve inch (12") core with 144 ply (both would be 12). Although a 5 inch core is preferred, the core can be in the range of 3 to 7 inches in diameter, and more desirably 4 to 6 inches in diameter. To my knowledge, nothing has ever been used (except for my 5" core) that even approaches this ratio. Even if it would have been used, the "working diameter" would be too large to get into "pockets" or curved vehicle areas and therefore not clean well. The small core has the best ability to cope with bumpers and other vehicle protrusions and yet stay (hug) with the vehicle and clean much better and faster as long as the ratio of plies to core diameter remains in the range of 5 to 12, preferably in the range of 8 to 12 for the lower ⅓ of the brush.

This design, as shown in FIG. 2, offers more protection for the vehicle against the lower part of the brush core causing damage. With larger diameter cores or ratios under 5 on the lower part of the core, "core-covers" need to be used (core-covers are pieces of cloth usually that are located right at the outer periphery of the brush core). See also my co-pending application Ser. No. 09/816,058, filed Mar. 23, 2001.

Figure 1:
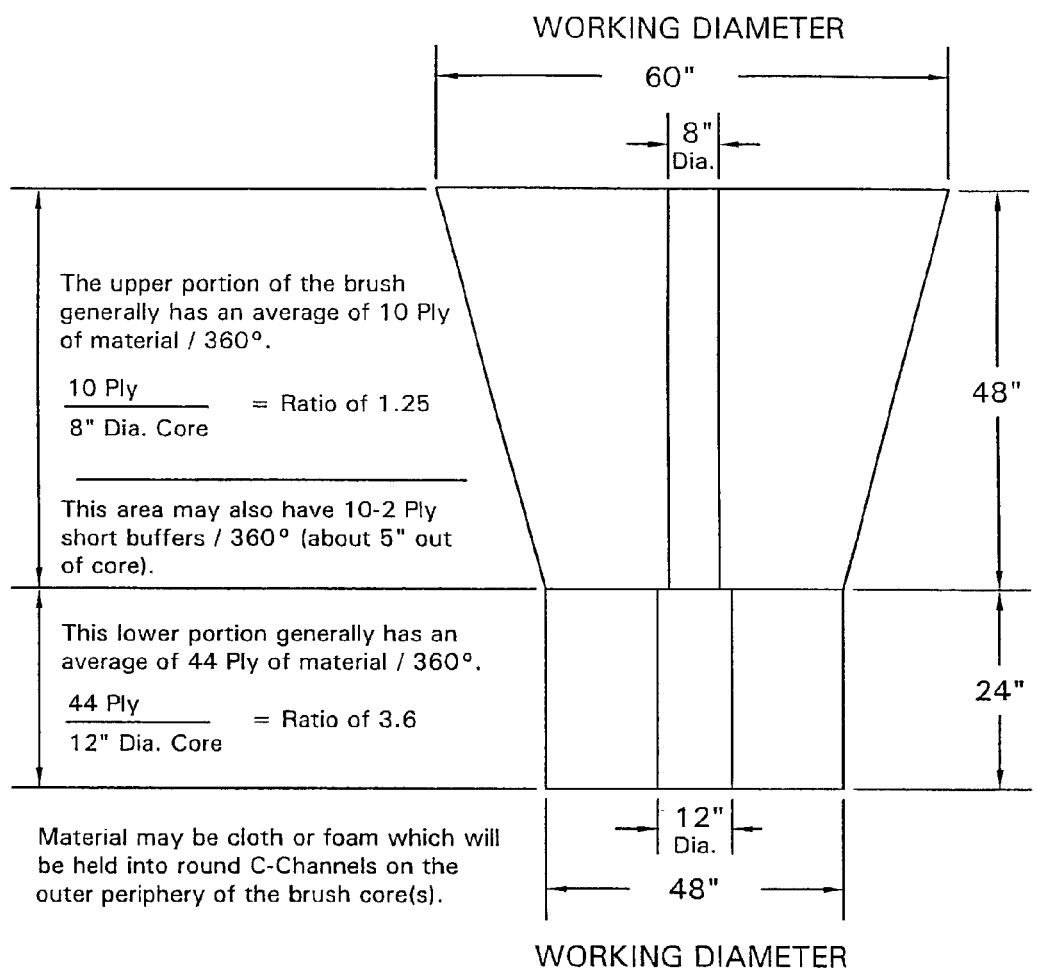
FIG. 1 is a schematic illustration of a prior art rotary brush construction.
Figure 5:
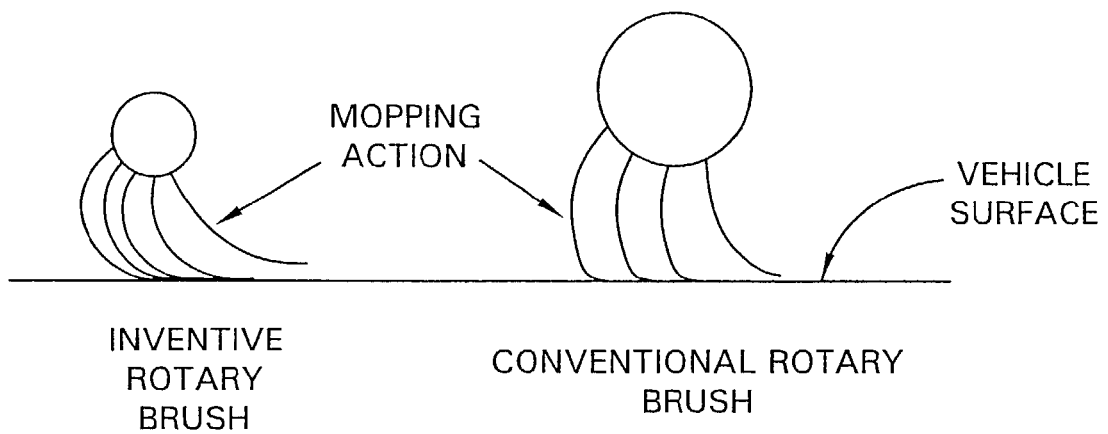
FIG. 5 is a schematic comparative illustration of the mopping characteristic/action of my inventive brush construction and the brush construction of FIG. 1.

With a smaller core and the core being closer to the vehicle there is more mopping action, as shown schematically in FIG. 5. Typical brush cores for the vehicle working industry are made with the outer periphery with a number of "C-channels" running lengthwise of the core. This is so cloth (or foam) pads can be slid down into these channels corresponding to the channels disclosed in my U.S. Pat. No. 5,623,741, and pending application Ser. No. 09/816,058, filed Mar. 23, 2001, the subject matters of which are incorporated herein by reference. In my design, as can be seen on my seventy-two inch (72") high HUGGER™ brush, I cut two pieces of five inch (5") diameter ½ round aluminum with "C-channels" around the outer periphery. Then three pieces of approximately five inch (5") diameter extruded aluminum are cut into 2" long lengths. The top collar will have 4 drilled and tapped holes for attaching a drive mechanism. A 1¼" hole is machined into the center to aid in the welding of the parts together so that they are true and will allow the brush to rotate and be balanced. The two half rounds and the three collars (one at each end and one in the center) are welded together for a strong, balanced brush core. The "C-channels" at the bottom end of the core are welded closed by inserting aluminum "rivets" in all of the channels and then welding them closed. The core is now ready for cloth or foam pads. The bottom ⅓ of the brush usually has WAVY-CUT® fingers, corresponding to the cloth disclosed in my aforesaid U.S. Pat. No. 5,623,741, to clean the dirty rocker panel and the amount of material inserted will be as shown on accompanying sketch.

In theory, the reason for the noticeably better cleaning results using the small 5" core as compared to, for example, a 12" core, is believed to be the following. If the perimeter of a 12" core and the perimeter of a 5" core are assumed to be the same distance from the surface of the vehicle being washed and if both cores had the same number of plies/360°, then the pads in a 12" core are 2.4 (12/5) times as far apart on the outer periphery as those on the 5" core. Therefore, while it might be difficult to measure the exact percentage of increase of "drag" or "mopping" action that the pads in a 5" core have over those in a 12" core, I believe it is safe to conclude that it is twice as much due to this factor alone.

Also, since the results of testing this smaller core and finding it does hug the vehicle considerably better, with the distance from the perimeter of the core to the vehicle less than that of a 12" core, is another reason to know that there is more "drag" and more "mopping" action due to this condition.

Considering the aforementioned two factors together, I believe that the "drag" or "mopping" action with the 5" core is three times that of the 12" core. This same reasoning applies to the number of plies of pads in back of (and radially outwardly oriented) and pushing against the pad that is washing the vehicle at any given instant. That is, the extra "push" that each washing pad receives from those radially outwardly thereof, which has to be three times that which is occurring in a 12" core, contributes greatly to the smaller core brush cleaning much better (and due to its "hugging" the vehicle) than the 12" core brush.

What is claimed is:
1. A vehicle washing brush assembly comprising:
   a cylindrical holder configuration having plural cloth or foam pads secured thereto and configured to be centrifugally extended radially outwardly from said holder and into surface treating engagement with a vehicle surface;
   a first longitudinal length of said holder having a selected number of separate cloth or foam pads oriented around the perimeter of said first longitudinal length of said holder so that the ratio of the number of cloth or foam pads per 360° of the holder to an outer diameter of said first longitudinal length of said holder is in the range of 8 to 12;
   a second longitudinal length of said holder having a selected number of separate cloth or foam pads oriented around the perimeter of said second longitudinal length of said holder so that the ratio of the number of cloth or foam pads per 360° of the holder to an outer diameter of said second longitudinal length of said holder is 6.0 or less;
   wherein said holder is of a uniform diameter for an entire length of said holder and wherein said outer diameter is approximately 5 inches.
2. A vehicle washing brush assembly comprising:
   a cylindrical holder configuration having plural cloth or foam pads secured thereto and configured to be centrifugally extended radially outwardly from said holder and into surface treating engagement with a vehicle surface;
   a first longitudinal length of said holder having a selected number of separate cloth or foam pads oriented around the perimeter of said first longitudinal length of said holder so that the ratio of the number of cloth or foam pads per 360° of the holder to an outer diameter of said first longitudinal length of said holder is in the range of 5 to 12;
   a second longitudinal length of said holder having a selected number of separate cloth or foam pads oriented around the perimeter of said second longitudinal length of said holder so that the ratio of the number of cloth or foam pads per 360° of the holder to an outer diameter of said second longitudinal length of said holder is 6.0 or less;
   wherein said holder is of a uniform diameter for an entire length of said holder and wherein said outer diameter is approximately 5 inches.

\* \* \* \* \*